United States Patent
Rainisto

(10) Patent No.: US 7,817,858 B2
(45) Date of Patent: Oct. 19, 2010

(54) COMMUNICATION TERMINAL

(75) Inventor: Roope Rainisto, Helsinki (FI)

(73) Assignee: Nokia Corporation, Espoo (FI)

( * ) Notice: Subject to any disclaimer, the term of this patent is extended or adjusted under 35 U.S.C. 154(b) by 937 days.

(21) Appl. No.: 11/554,911

(22) Filed: Oct. 31, 2006

(65) Prior Publication Data

US 2008/0101701 A1    May 1, 2008

(51) Int. Cl.
*G06K 9/00*    (2006.01)
*G06K 9/22*    (2006.01)

(52) U.S. Cl. ...................... 382/187; 382/313

(58) Field of Classification Search ......... 382/187–189, 382/313; 345/179
See application file for complete search history.

(56) References Cited

U.S. PATENT DOCUMENTS

| | | | |
|---|---|---|---|
| 6,088,481 A * | 7/2000 | Okamoto et al. ............ | 382/189 |
| 6,369,802 B1 * | 4/2002 | Ebisawa ..................... | 345/173 |
| 2003/0223640 A1 * | 12/2003 | Homiller .................... | 382/219 |
| 2004/0070569 A1 * | 4/2004 | Muthuswamy et al. ...... | 345/169 |
| 2004/0196266 A1 * | 10/2004 | Matsuura et al. ............ | 345/169 |
| 2006/0015812 A1 * | 1/2006 | Cunningham et al. ....... | 715/535 |
| 2007/0236461 A1 * | 10/2007 | Griffin et al. ................ | 345/169 |

* cited by examiner

Primary Examiner—Daniel G Mariam

(57) ABSTRACT

It is shown how to select and insert a non-textual, e.g. a smiley, into an application such as a chat application in a communication terminal. A smiley insertion area in the form of a hand writing input area is displayed under the control of a user interface application. After recording that a stylus, or similar device, has been used in drawing on the touch sensitive display, the drawing is matched in an interpretation process against a pattern library consisting of smileys and other non-textual symbols. After a successful match, the smiley symbol is appended to the text that is being input.

13 Claims, 2 Drawing Sheets

COMMUNICATION TERMINAL

TECHNICAL FIELD

The disclosed embodiments relate to a method and apparatus as well as a computer program for controlling input of non-textual symbols in a communication terminal.

BACKGROUND

Mobile telephones have evolved during the last few years from being simple voice communication devices to present day intelligent communication terminals having processing and communication capabilities that were almost unimaginable not long ago. Needless to say, the use of a mobile telephone now involves such activities as interactive message exchange in the form of "chatting", sending e-mail messages, browsing the World Wide Web as well as many other activities, both business related as well as more leisure oriented. Moreover, the operation of current communication terminals is often controlled via user interface means that include, in addition to or instead of traditional keypads, touch sensitive displays on which a virtual keypad is displayed. A user inputs text and other symbols using a stylus by touching the virtual keypad.

The application interactive messaging, chatting, has become very widely used, particularly among young people and the exchange of information typically involve text as well as other, non-textual, symbols. In particular, so-called "smileys" were invented as a cultural extension to plain textual symbols and digits. Originally these smileys were formed as plain text characters, like :-) and ;(. However, in current messaging and chatting applications, smileys are also provided as unique non-textual symbols, which are small graphical bitmaps.

A drawback with current terminals is that they typically display a plurality of, or all, possible non-textual symbols, including the smileys, for selection by the user. Current messaging and chat protocols typically support dozens of different smiley symbols, and their amount is on the increase. Hence, at least when considering terminals that are equipped with small display devices, simultaneously displaying a large number of smileys, which is preferable when operating a chatting application, may be considered as an unnecessary visual distraction from a user point of view and may be seen as an inefficient or clumsy method of selection.

SUMMARY OF THE INVENTION

An object of the disclosed embodiment is hence to overcome drawbacks with prior art, and in particular to overcome problems relating to the input of non-textual symbols into a symbol processing application in a communication terminal.

This object is achieved by way of a method, a communication device, as well as a computer program according to the appended claims.

That is, according to a first aspect of the invention there is provided a method of controlling input of non-textual symbols in a communication terminal during input of textual symbols to a symbol processing application. The terminal comprises control and communication circuitry and a touch sensitive display, and the method comprises detecting that a non-textual symbol is to be appended to the textual symbol input, displaying a hand writing input area, detecting handwriting input signals in the displayed hand writing input area, interpreting the handwriting input signals and, depending on the interpretation, displaying at least one candidate non-textual symbol and providing the at least one candidate non-textual symbol to the symbol processing application.

The detection that a non-textual symbol is to be appended may be a result of an analysis of already input symbols, and it may also be a result of a detection of a user action.

The displaying of a hand writing input area may further comprise displaying a non-textual guiding pattern that may comprise a generic smiley symbol.

Furthermore, if the interpretation results in plural candidate non-textual symbols, the method may comprise displaying the plurality of candidate non-textual symbols and detecting a user selection of one candidate non-textual symbol among the displayed plurality of candidate non-textual symbols prior to providing the selected non-textual symbol to the symbol processing application.

The detection of handwriting input signals, the interpretation of the handwriting input signals and displaying candidate non-textual symbols may be performed essentially concurrently and thereby providing the user with an enhanced interactive feeling.

The interpretation of the handwriting input signals may comprise use of associations between user specified patterns and user selected non-textual symbols. That is, "user specified" smileys are possible in that a user may previously have specified or selected a particular non-textual symbol and then "trained" an interpretation function to interpret a specific pattern of handwriting signals as the selected non-textual symbol.

Furthermore, the interpretation of the handwriting input signals may comprise use of a selected pattern library, the selection being dependent on the symbol processing application. That is, depending on with which symbol processing application the inventive method interacts, different sets of non-textual symbols may be used.

Bearing in mind then that, embodiments include those where the symbol processing application is a messaging application, for example a chat application, different sets of smileys can be used when chatting in different networks.

Moreover, the interpretation of the handwriting input signals may comprise creation of at least one non-textual symbol, the creation being based on the detected handwriting input signals, and providing the created non-textual symbol as a candidate non-textual symbol. That is, "custom made" non-textual symbols are possible. For example, if the interpretation of handwriting input symbols fails to provide a reasonably good match with any symbol in a pattern library, the interpretation process may generate a new candidate, created from the handwriting input symbols. This newly created symbol may then be provided, together with any other candidate symbols, for selection by the user. The newly created symbol may also be stored, e.g. in a pattern library, for later use in subsequent interpretations of handwriting input signals.

In a second aspect, there is provided a communication device comprising control and communication circuitry and a touch sensitive display configured such that the communication device is capable of detecting that a non-textual symbol is to be appended to the textual symbol input, displaying a hand writing input area, detecting handwriting input signals in the displayed hand writing input area, interpreting the handwriting input signals, and depending on the interpretation, displaying at least one candidate non-textual symbol and providing the at least one candidate non-textual symbol to a symbol processing application.

In a third aspect, there is provided a computer program comprising computer program code that, when executed in a processor, performs the method as described above.

In other words, the invention provides how to select and insert a non-textual, e.g. a smiley, into an application such as a chat application in a communication terminal. A smiley insertion area in the form of a hand writing input area is displayed under the control of a user interface application. The actual launch of the hand writing input area may be triggered automatically, e.g. on recognizing a context of a text being input, or explicitly triggered via the user interface when it detects a user action such as a tapping action by the user on a specific virtual key on the virtual keypad.

After recording that a stylus, or similar device, has been used in drawing on the touch sensitive display, the drawing is matched in an interpretation process against a pattern library consisting of smileys and other non-textual symbols. After a successful match, the smiley symbol is appended to the text that is being input. The smiley insertion area may then be cleared to allow for further input. If multiple possible candidates are found in the interpretation process, they may be displayed in, or at least in the vicinity of, the smiley insertion area. The user is then able to switch between the candidate symbols by selecting any of them.

By displaying a generic smiley as a guiding or "background" pattern, e.g. in a subdued color, the user is provided with a passive aid when drawing the shape and details of a "user designed" smiley in the hand writing input area. Of course, the "user designed" smiley that is drawn in the input area may comprise any desired details, irrespective of the appearance of the guiding pattern.

Hence, the invention solves the problems described above in that a modestly sized display area allows a user to input a large number of different smileys and other patterns without having to select from a large hard to grasp set of displayed symbols.

Another advantage is that it provides a more intuitive and also more enjoyable way of communicating when using, e.g., a chat application. That is, drawing a smiley face and getting an immediate result is fun in terms of what the drawing interpretation engine makes of the drawing and what it proposes as a result in terms of candidate smileys. Even "errors" in this process can be seen as fun, the engine proposing some smiley that the user didn't originally think of getting.

DETAILED DESCRIPTION OF PREFERRED EMBODIMENTS

Figure 1:
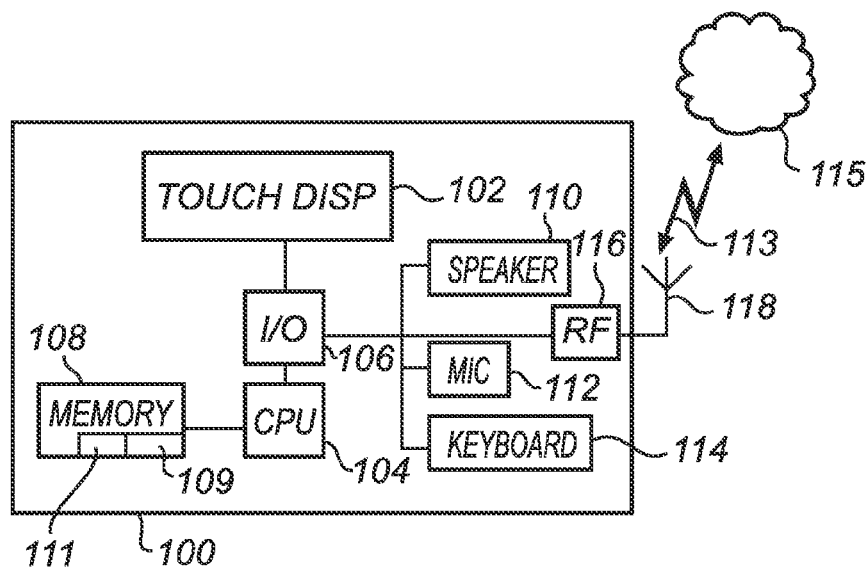
FIG. 1 shows a schematically drawn block diagram of an embodiment of a mobile communication device according to the disclosed embodiments.

FIG. 1 illustrates schematically a communication device in the form of a mobile telephone terminal 100 in which the disclosed embodiments can be is implemented. The telephone 100 is capable of communication via an RF-unit 116 and an antenna 118 through an air interface 113 with a mobile (radio) communication system 115 such as the well known systems GSM/GPRS, UMTS, CDMA 2000 etc.

The terminal 100 comprises a processor 104, memory 108 as well as input/output units in the form of a speaker 110, a microphone 112, a keyboard 114 and a touch sensitive display 102 on which a user writes using, e.g., a stylus or similar device. The input/output units communicate with the processor 104 through an I/O-interface 106. The details regarding how these units communicate are known to the skilled person and is therefore not discussed further. The communication terminal 100 may, in addition to the illustrated mobile telephone terminal, a Personal Digital Assistant (PDA) equipped with radio communication means.

The method according to the preferred embodiments will in general reside in the form of software instructions of a computer program 109 with an associated memory area 111, together with other software components necessary for the operation of the terminal 100, in the memory 108 of the terminal 100. The computer program 109 may be resident or it may be loaded into the memory 108 from a software provider, e.g. via the air interface 113 and the network 115, by way of methods known to the skilled person. The program 109 will be executed by the processor 104, which will receive and process input data from the different units in the terminal 100, particularly input data in the form of trace signals from the touch sensitive display 102, as will be discussed below.

Figure 2:
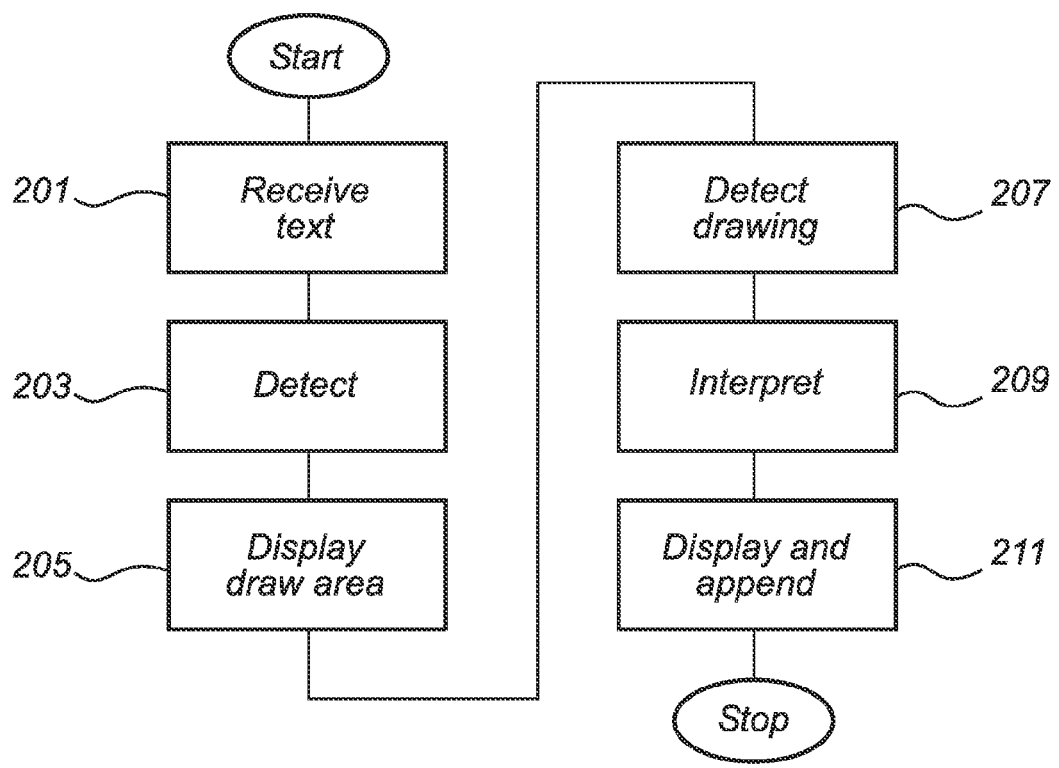
FIG. 2 is a flow chart illustrating an embodiment of a method according to the disclosed embodiment.

A method according to the disclosed embodiments will now be described with reference to the flow chart in FIG. 2 and with references to the screen shots in FIGS. 3a-c.

Figure 3A:
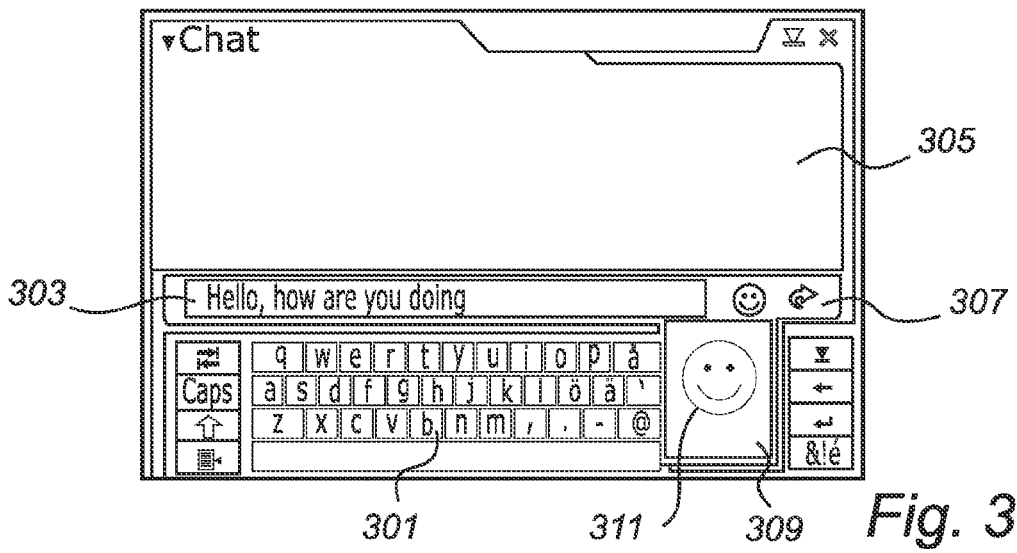
FIGS. 3a-c are screen shots of a communication terminal during execution of a computer program that implements the method described with reference to FIG. 2.
Figure 3B:
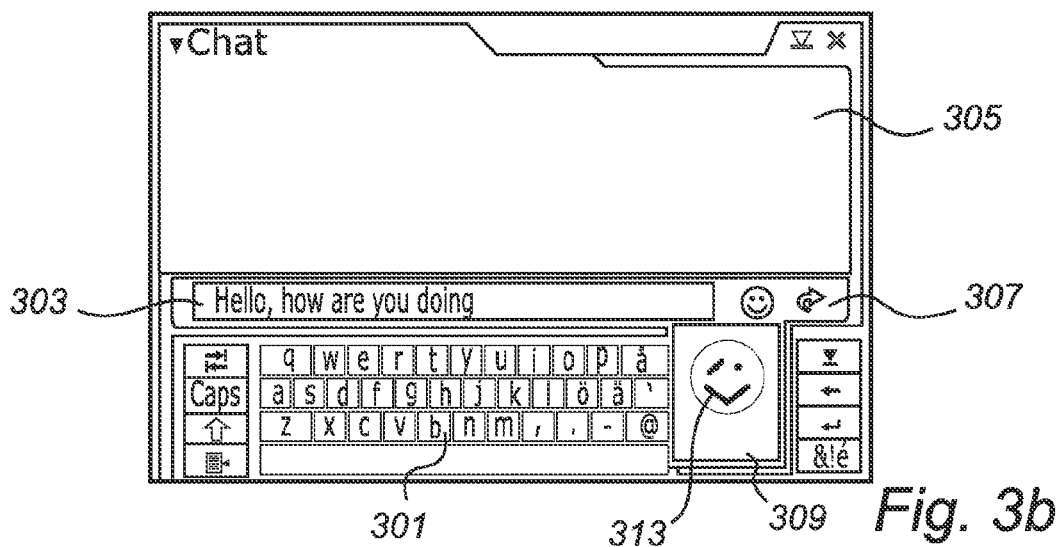
Figure 3C:
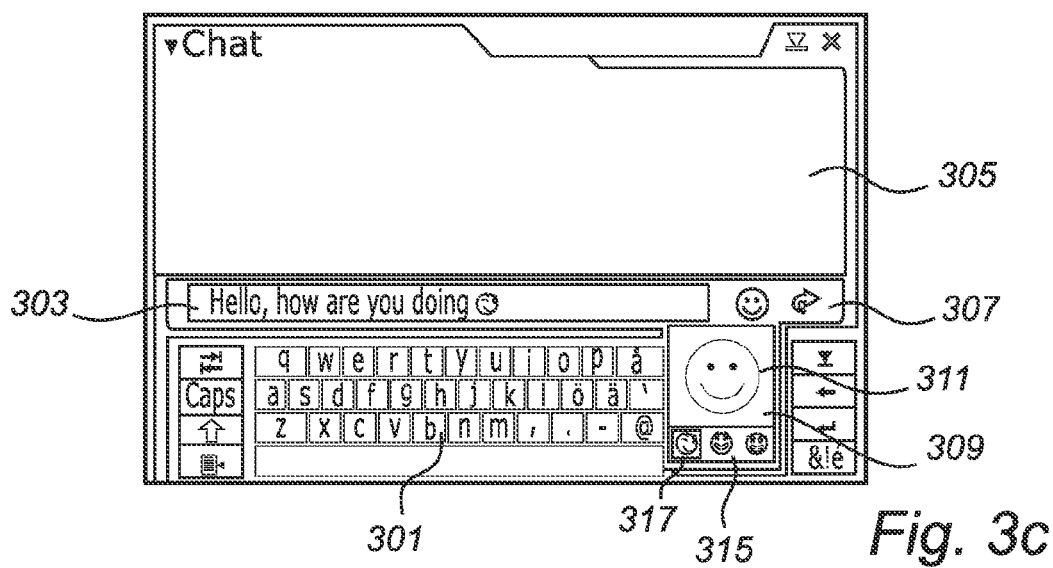

The screen shots of FIGS. 3a-c show the appearance of a display of a communication terminal, for example the terminal 100 described above in connection with FIG. 1. A chat application is executing in the terminal and displays on the display a virtual keypad 301 on which a user taps, using a stylus object or similar, whereby text is generated and displayed in a text input area 303. The chat session displays, in a dialog window 305, the different messages that are exchanged between the chatting parties.

The method hence commences with a text input step 201 and continues in a detection step 203 during which it is detected that the user of the terminal desires to input a smiley into the text being input. The detection is done when the user taps in a smiley detection area 307. This results in that a hand writing input area 309 is displayed in a display step 205, during which a dimmed guiding pattern 311 of a generic or "standard" smiley is displayed. The user then uses the stylus to draw in the input area 309, during a detection step 207, in which traces 313 of the stylus are detected and displayed. Then, after a short timeout period or concurrently with the detection, the detected traces 313 are provided to a interpretation engine, executing in the terminal, which matches, in an interpretation step 209, the traces 313 with predetermined smiley symbols. The result of the interpretation is then displayed, during a display step 211, in a smiley candidate list area 315. Alternatively, the detected traces 313 may simultaneously be provided to the interpretation engine such that candidate smileys are shown while the traces are being detected.

In the situation depicted in FIG. 3c, there are three possible interpretations of the input traces 313, as evidenced by three candidates in the candidate list area 315. One candidate 317 is considered as the most probable candidate by the interpretation engine and is as such framed by a rectangle when displayed in the candidate list area 315. After a timeout period, the candidate 317 is appended to the text being input area 303. Alternatively, the user may select by tapping the stylus on any other candidate in the candidate list area 315 and thereby appending any other candidate smiley to the input area 303.

The invention claimed is:

1. A method of controlling input of non-textual symbols in a communication terminal during input of textual symbols to a symbol processing application, said terminal comprising control and communication circuitry and a touch sensitive display, the method comprising:

- detecting that a non-textual symbol is to be appended to a textual symbol input,
- displaying a hand writing input area upon detection that a non-textual symbol is to be appended to a textual symbol input,
- detecting handwriting input signals in the displayed hand writing input area,
- interpreting the handwriting input signals, and
- depending on the interpretation, displaying at least one candidate non-textual symbol and providing the at least one candidate non-textual symbol to the symbol processing application.

2. The method of claim 1, where the detection that a non-textual symbol is to be appended is a result of an analysis of already input symbols.

3. The method of claim 1, where the detection that a non-textual symbol is to be appended is a result of a detection of a user action.

4. The method of claim 1, where the displaying of a hand writing input area comprises displaying a non-textual guiding pattern.

5. The method of claim 4, wherein the displaying of the guiding pattern comprises displaying a generic smiley symbol.

6. The method of claim 1, where, if the interpretation results in plural candidate non-textual symbols, displaying the plurality of candidate non-textual symbols and detecting a user selection of one candidate non-textual symbol among the displayed plurality of candidate non-textual symbols prior to providing the selected non-textual symbol to the symbol processing application.

7. The method of claim 1, where the detection of handwriting input signals, the interpretation of the handwriting input signals and displaying candidate non-textual symbols is performed essentially concurrently.

8. The method of claim 1, where the interpretation of the handwriting input signals comprises use of associations between user specified patterns and user selected non-textual symbols.

9. The method of claim 1, where the interpretation of the handwriting input signals comprises use of a selected pattern library, the selection being dependent on the symbol processing application.

10. The method of claim 1, where the interpretation of the handwriting input signals comprises creation of at least one non-textual symbol, the creation being based on the detected handwriting input signals, and providing the created non-textual symbol as a candidate non-textual symbol.

11. The method of claim 1, where the symbol processing application is a messaging application.

12. A computer program stored on a non-transitory computer-readable medium comprising computer program code that, when executed in a processor, performs the method according to claim 1.

13. A communication device comprising control and communication circuitry and a touch sensitive display configured such that the communication device is configured to:

- detect that a non-textual symbol is to be appended to a textual symbol input,
- display a hand writing input area upon detection that a non-textual symbol is to be appended to a textual symbol input,
- detect handwriting input signals in the displayed hand writing input area,
- interpret the handwriting input signals, and depending on the interpretation, display at least one candidate non-textual symbol and providing the at least one candidate non-textual symbol to a symbol processing application.

* * * * *